UNITED STATES PATENT OFFICE.

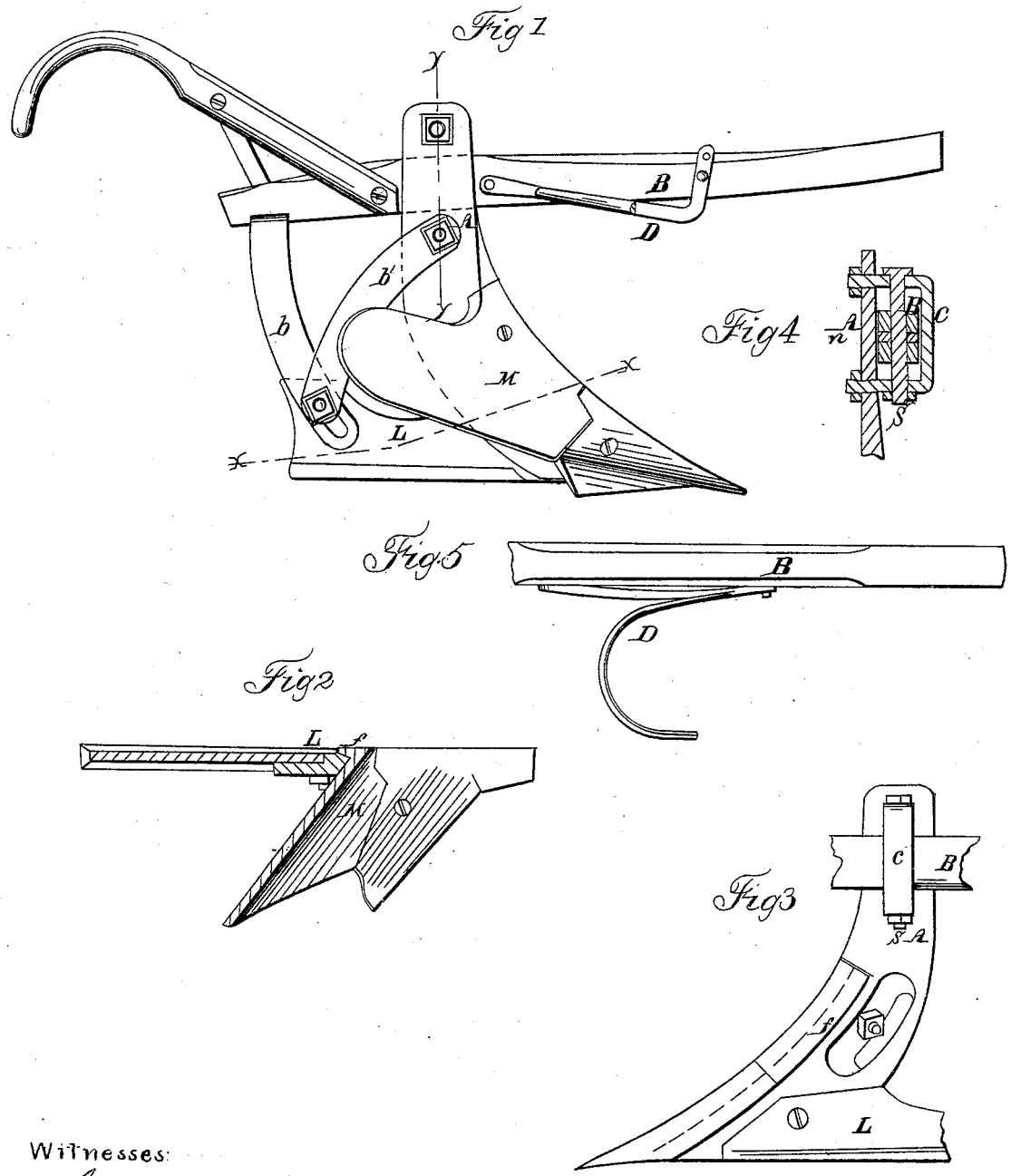

WILLIAM B. WILLIAMS, OF WARRENTON, NORTH CAROLINA.

IMPROVEMENT IN PLOWS.

Specification forming part of Letters Patent No. 25,463, dated September 13, 1859.

*To all whom it may concern:*

Be it known that I, W. B. WILLIAMS, of Warrenton, in the county of Warren and State of North Carolina, have invented a new and useful Improvement in Plows; and I do hereby declare that the following is a full, clear, and exact description of the same, reference being had to the annexed drawings, forming part of this specification, in the several figures of which similar characters of reference denote the same part.

Figure 1 is a side view of my improved plow. Fig. 2 is a longitudinal section on line $x\ x$, showing the attachment of the mold-board to the landside. Fig. 3 is a side view of the standard, showing the overlapping flange of the mold-board. Fig. 4 is a vertical section on line $y\ y$, showing the arrangement for regulating the depth of plowing. Fig. 5 shows the end of the beam with the weed-gatherer attached.

The nature of the invention consists in having a screw-bolt passing through the cuff by which the standard is fastened to the beam, and through a nut in the beam, for the purpose of raising or lowering the standard according to the depth desired to plow. The brace connecting the end of the beam and the landside is slotted, so as to move with the beam. The mold-board has a flange which laps over the landside and standard, so as to make all the wear on the mold-board and not on landside or standard; and there is also a curved arm attached to the beam over the mold-board, for collecting the weeds and throwing them into the furrow. It is also vertically adjustable.

In the drawings, B represents the beam, having the nut $n$ in it; $c$, the cuff to which the standard is attached; S, the screw-bolt, passing through the cuff and nut in the beam. M is the mold-board; L, the landside; A, the standard; $b$, the slotted brace from beam to landside; $b'$, a brace from standard to landside; and D is the weed-gatherer attached to the beam.

By loosening the standard from the cuff and turning the screw-bolt S the standard is raised or lowered on the beam, so as to make the furrow of any required depth. The brace $b$ being slotted also allows its attachment to the landside to move in the slot. The mold-board having the flange $f$ lapping over the standard and landside prevents any wear on them by making the wear all on the mold-board; and the curved arm D, attached to the beam, gathers the weeds and throws them forward into the furrow instead of scattering them on each side, as is usually the case.

Having thus described my invention, what I claim and desire to secure by Letters Patent, is—

1. The combination of screw-bolt S, nut $n$, in beam B, standard A, cuff $c$, and slotted brace $b$, to regulate the depth of plowing, substantially as described.

2. In combination with the above, the curved arm D for collecting weeds, substantially as described.

In testimony whereof I have hereunto signed my name before two subscribing witnesses.

W. B. WILLIAMS.

Witnesses:
GEO. PATTEN,
JOHN S. HOLLINGSHEAD.